June 8, 1965  P. F. WAIVERS  3,187,811
FLUID COOLED WASHER
Filed Feb. 14, 1963
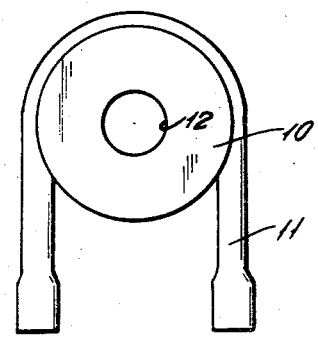
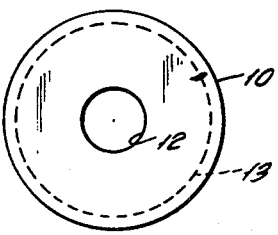
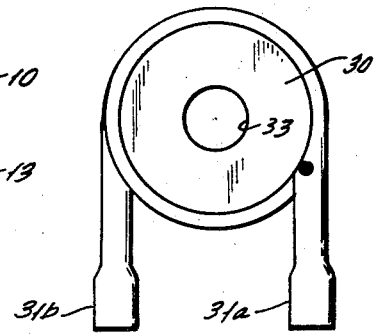
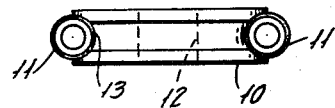
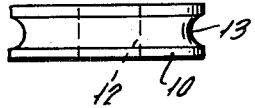
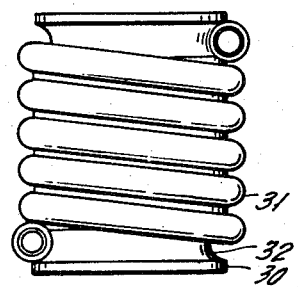
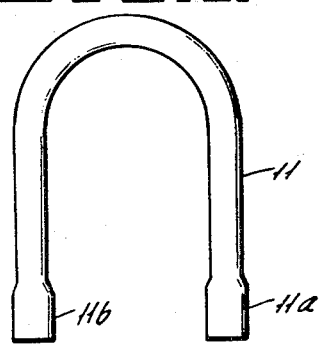
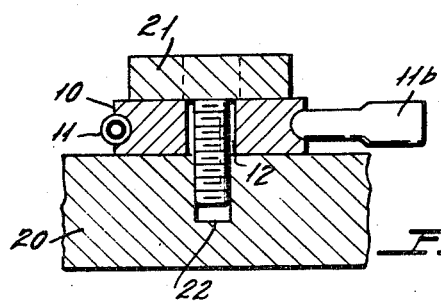
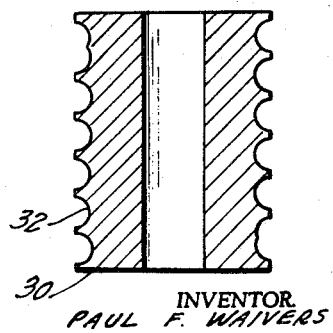
INVENTOR
PAUL F. WAIVERS
BY
OSTROLENK, FABER, GERB & SOFFEN
ATTORNEYS Patented June 8, 1965

3,187,811
FLUID COOLED WASHER
Paul F. Waivers, Florence, N.J., assignor to United Aero Products, Division of Aero Chatillon Corporation, Burlington, N.J., a corporation of New York
Filed Feb. 14, 1963, Ser. No. 258,458
1 Claim. (Cl. 165—168)

My invention relates to a novel fluid cooled washer of the type shown in my copending application Serial No. 225,014, filed September 20, 1962, wherein the conduit which carries a heat exchange medium is wound directly on the outside surface of the washer body. Fluid cooled washer have utility as heat sinks or heat sources and can be directly and intimately connected to a member which requires thermal control. By way of example, a washer constructed in accordance with the invention could be directly secured to a semiconductor type device which has some critical high operating temperature. A coolant can then be forced through the cooling conduit secured to the washer to permit the semiconductor device to be operated at higher power ratings with efficient heat exchange occurring between the semiconductor device and the coolant containing washer.

In my above noted copending application Serial No. 225,014, the cooling conduit means is contained internally of the washer body. While this type construction provides ideal heat transfer characteristics between the coolant and the washer assembly, it is relatively expensive. In accordance with the present invention, it is recognized that the external body of the washer member can be formed to conform with the internal diameter surface configuration of a conduit which is in intimate contact with the external surface of the washer. Thus good heat transfer characteristics are established and relatively little machining is required for the washer structure.

Accordingly, a primary object of this invention is to provide a novel washer which can be connected to a body and serve as a heat source or heat sink for the body.

Another object of this invention is to provide a novel fluid cooled washer which is relatively inexpensive to manufacture.

A further object of this invention is to provide a novel fluid cooled washer which is inexpensive to manufacture and provides excellent heat transfer characteristics.

These and other objects of my invention will become apparent from the following description when taken in connection with the drawings, in which:

FIGURE 1 is a top plan view of a first embodiment of the invention.

FIGURE 2 is a front plan view of FIGURE 1.

FIGURE 3 is a top view of the washer body of FIGURE 1.

FIGURE 4 is a side view of the washer body of FIGURE 1.

FIGURE 5 is a top plan view of the conduit used in the washer of FIGURE 1.

FIGURE 6 illustrates the manner in which the washer of FIGURE 1 can be secured to a body by a bolt means.

FIGURE 7 is a top plan view of a washer constructed in accordance with the second embodiment of the invention.

FIGURE 8 is a front plan view of the washer of FIGURE 7.

FIGURE 9 is a side cross-sectional view through the washer body of the washer of FIGURE 7.

Referring first to FIGURES 1 and 2, I have illustrated therein the first embodiment of the invention wherein the washer structure is comprised of a washer body 10 and a conduit 11 which is secured thereto as by brazing or in any other desired manner. The washer body 10 is shown in more detail in FIGURES 3 and 4 and it is seen that the body, which may be of stainless steel, has a central opening 12 therethrough and has a groove 13 about its outer rim. The conduit 11, which is shown in more detail in FIGURE 5, may be a conduit of stainless steel having an inner diameter, for example, of the order of 0.126 inch, and a wall thickness of 0.20 inch. The outer ends 11a and 11b of conduit 11 may be expanded as shown for solder-type connection to standard ⅛" tubing.

The conduit 11 is then bent in the U shape shown on a radius, for example, of 5/16 inch, in a typical embodiment of the invention, which conforms to the inner radius of groove 13. The conduit 11 is then secured within groove 13 of body 11 as shown in FIGURES 1 and 2, in any desired manner, as by brazing, as described above. The complete unit then has the conduit 11 and washer body 10 in intimate thermal relationship whereby a heat exchange medium which is circulated through conduit 11 will provide extremely effective thermal transfer between the medium and the washer body 10 as well as those bodies to which washer 10 is connected.

FIGURE 6 illustrates one manner in which the washer of FIGURE 2 may be used. Thus, in FIGURE 6 a body 20 is a body which is to be either heated or cooled. The washer assembly which includes body 10 and conduit 11 may then be directly bolted to body 20 by means of any appropriate bolt 21 which passes through opening 12 and is threaded into a tapped opening 22 in body 20. It will be observed that extremely intimate thermal contact exists between body 10 and body 20 whereby a heat exchange medium circulating through conduit 11 will serve as an efficient heat source or heat sink for body 20.

While the embodiment of FIGURES 1 through 6 illustrate the the washer of the invention as having a single turn conduit, the conduit may have a plurality of convolutions. A device of this type is illustrated in FIGURES 7 and 8 wherein the washer is formed of an elongated stainless steel body 30 which has a coiled conduit 31, which may be of the same type as that shown in FIGURE 5, about its outer surface. The body 30 is shown in cross section in FIGURE 9 where it is seen that the outer surface is provided with a screw type thread 32 wherein the cross sectional shape of the thread conforms to the shape of the conduit 31.

In assembling the device the conduit 31 may be first wound in a coil of an appropriate number of turns which terminates with the expanded ends 31a and 31b with the coil thereafter being screwed onto thread 32. Thereafter, the conduit 31 can be brazed to body 30. Alternatively, the grooved portion 32 of body 30 can be used directly as a guide over which the coil 31 can be wound and thereafter brazed, if so desired. In order to mount the washer of FIGURES 7 and 8, an opening 33 is formed in body 30 for reception of a bolt or any other similar structure.

It will be noted that by recessing the conduit into the washer body in each of the embodiments of the invention, that the external contact area between the washer body and conduit is substantially increased to thereby improve the heat exchange efficiency between the two members.

Although I have described preferred embodiments of my novel invention, many variations and modifications will now be apparent to those skilled in the art, and I prefer therefore to be limited not by the specific disclosure herein but only by the appended claim.

I claim:

A heat exchange washer; said heat exchange washer comprising a disk-shaped metallic washer body having parallel end surfaces connected by an outer peripheral surface and a U-shaped hollow conduit member; said outer peripheral surface defining a continuous mounting recess having a concave cross-section; said U-shaped hollow conduit member being nested within said concave cross-section of said outer peripheral surface and lying in a plane parallel to the plane of said end surface of said washer; said U-shaped conduit having end sections extending tangently from said peripheral surface and being connectable to a heat exchange fluid source; said U-shaped conduit member constituted of a thermally conductive material for effecting heat transfer between a fluid fed therethrough and the thermally conductive material of said washer body; said washer body having a longitudinal opening extending therethrough for receiving fastening means for securing said washer to a member in heat exchange relation.

References Cited by the Examiner

UNITED STATES PATENTS

| 865,803 | 9/07 | Row | 29—157.3 |
| 2,231,295 | 2/41 | Price | 165—51 |
| 2,287,066 | 6/42 | Rogers | 165—184 X |
| 2,934,257 | 4/60 | Power | 165—47 X |

FOREIGN PATENTS 254,069  12/48  Sweden.

CHARLES SUKALO, *Primary Examiner.*